United States Patent
Zhang et al.

(10) Patent No.: US 9,874,275 B2
(45) Date of Patent: Jan. 23, 2018

(54) TWO-SPEED PLANETARY TRANSMISSION

(71) Applicant: CHANGFENG GROUP CO., LTD., Changsha (CN)

(72) Inventors: Huaping Zhang, Changsha (CN); Xiaolan Hu, Changsha (CN); Wei Huang, Changsha (CN); Zhibin Rong, Changsha (CN)

(73) Assignee: CHANGFENG GROUP CO., LTD., Changsha (CN)

( * ) Notice: Subject to any disclaimer, the term of this patent is extended or adjusted under 35 U.S.C. 154(b) by 99 days.

(21) Appl. No.: 15/132,203

(22) Filed: Apr. 18, 2016

(65) Prior Publication Data
US 2016/0230876 A1    Aug. 11, 2016

Related U.S. Application Data

(63) Continuation-in-part of application No. PCT/CN2015/080811, filed on Jun. 4, 2015.

(30) Foreign Application Priority Data

Dec. 10, 2014    (CN) .......................... 2014 1 0751463

(51) Int. Cl.
*F16H 3/44* (2006.01)
*F16H 57/10* (2006.01)

(52) U.S. Cl.
CPC ............... *F16H 57/10* (2013.01); *F16H 3/44* (2013.01); *F16H 2200/0034* (2013.01); *F16H 2200/2005* (2013.01); *F16H 2200/2033* (2013.01); *F16H 2200/2035* (2013.01)

(58) Field of Classification Search
CPC .. F16H 3/44; F16H 357/10; F16H 2200/2033; F16H 2200/2005; F16H 2200/2035; F16H 2200/0034
USPC ....... 475/317, 319, 320, 321, 338; 192/48.3, 192/48.7
See application file for complete search history.

(56) References Cited

U.S. PATENT DOCUMENTS

| 3,943,780 | A | * | 3/1976 | Klaue | F16H 1/2836 475/219 |
| 6,093,974 | A | * | 7/2000 | Tabata | B60K 6/365 180/65.25 |
| 2008/0261766 | A1 | * | 10/2008 | Koyama | F16H 37/022 475/280 |
| 2015/0158382 | A1 | * | 6/2015 | Mordukhovich | F16H 3/663 475/318 |

(Continued)

*Primary Examiner* — Roger L Pang
(74) *Attorney, Agent, or Firm* — Matthias Scholl, PC; Matthias Scholl

(57) ABSTRACT

A two-speed automatic planetary transmission, including a sun gear, dual planet gears, a planet carrier, a ring gear, a band-type brake ring, and a locking ring. The locking ring is disposed between the outer surface of the ring gear and the inner surface of the annular lug boss, and the inner surface of the locking ring is fixedly connected to the outer surface of the ring gear. Part of the outer surface of the locking ring contacts with the inner surface of the annular lug boss, and another part thereof is sheathed with the band-type brake ring. One end of the band-type brake ring is a fixed end, and is fixedly connected to a transmission shell; and another one is an unfixed end which is connected to a gear shifting actuator.

18 Claims, 13 Drawing Sheets

(56) References Cited

U.S. PATENT DOCUMENTS

2016/0033015 A1\* 2/2016 Hwang ................ B60K 6/365
                                                        475/5
2017/0023105 A1\* 1/2017 Slapak ................ F16H 37/046

\* cited by examiner

# TWO-SPEED PLANETARY TRANSMISSION

CROSS-REFERENCE TO RELATED APPLICATIONS

This application is a continuation-in-part of International Patent Application No. PCT/CN2015/080811 with an international filing date of Jun. 4, 2015, designating the United States, now pending, and further claims priority benefits to Chinese Patent Application No. 201410751463.1 filed Dec. 10, 2014. The contents of all of the aforementioned applications, including any intervening amendments thereto, are incorporated herein by reference.

BACKGROUND OF THE INVENTION

Field of the Invention

The invention relates to a two-speed automatic planetary transmission.

Description of the Related Art

Existing transmission used for electric vehicles include single-speed reducer, two-speed manual transmission (MT), two-speed automatic transmission (AT), and two-speed automatic mechanical transmission (AMT). All of these have shortcomings.

For example, the single-speed reducer has a fixed speed ratio, as a result, the maximum gradeability, the highest speed, and the optimal work efficiency of an electric motor cannot be achieved synchronously. Therefore, it is proposed to use two-speed transmission. However, the two-speed manual transmission needs manual operation, while the two-speed automatic transmission involves at least an oil pump and a clutch, which increases the size and weight of the transmission, as well as the production cost; besides, the power interruption is prone to appear during the shifting.

SUMMARY OF THE INVENTION

In view of the above-described problems, it is one objective of the invention to provide a two-speed automatic planetary transmission which features simple structure, reliable performance, low cost, high transmission efficiency, stable motion, and impact resistance. In addition, the transmission is energy-saving, safe and easy to promote and apply.

To achieve the above objective, in accordance with one embodiment of the invention, there is provided a two-speed automatic planetary transmission, comprising a sun gear, dual planet gears, a planet carrier, a ring gear, a band-type brake ring, and a locking ring. One side of the planet carrier which is used to fix the double planetary gears is connected to the output shaft. While each planetary gear which contains two gears is engaged with the sun gear and the ring gear. The sun gear connects an input shaft. The planet carrier is provided with an annular lug boss. The locking ring is disposed between the outer surface of the ring gear and the inner surface of the annular lug boss, and the inner surface of the locking ring is fixedly connected to the outer surface of the ring gear. Both ends of the outer surface of the locking ring contacts the inner surface of the annular lug boss, and the middle portion is sheathed with the band-type brake ring. One end of the band-type brake ring is fixed with transmission shell, and another end regarded as an unfixed end is connected to a gear shifting actuator.

In a class of this embodiment, the locking ring comprises elastic sheets which are raised up from and equally distributed on the outer surface of the locking ring. The outer surface of the locking ring is uniformly distributed with elastic sheets that respect to the outer surface of the ring. The locking ring is made from spring steel. The elastic sheets are shaped by stamping process.

In a class of this embodiment, the locking ring comprises wedge blocks which are tilted. One end of each of the wedge blocks is disposed on the locking ring, and the other one is free. Each wedge block and the locking ring are connected by spring in the middle portion of the wedge block.

In a class of this embodiment, the end of each wedge block is inserted in or hinged on the locking ring.

In a class of this embodiment, the locking ring comprises a plurality of rigid friction blocks. The rigid friction blocks are disposed between the inner ring and the outer ring as a power transmitting member which transmit rotational motion or torque through friction force.

In a class of this embodiment, the rigid friction blocks are rigid metal blocks comprising positioning parts and friction parts.

In a class of this embodiment, an outer surface of the inner ring of the power transmitting member contains first positioning slots used to install the rigid friction blocks. And the coil springs are disposed between the rigid friction blocks and the first positioning slots to tightly press the rigid friction blocks on the inner peripheral surface of the outer ring of the power transmitting member.

In a class of this embodiment, a non-contact part between the rigid friction blocks and the outer ring is for the band-type brake ring which is adapted to be tensioned and contracted.

Preferably, the cross sections of the rigid friction blocks are T-shaped, and are vertical tangents to the inner ring and the outer ring of the power transmitting member, where the narrow part of the T-shaped rigid friction block is the positioning parts, and is positioned in the positioning slots; while the wide part of the T-shaped rigid friction blocks is the friction parts which contact the surface of the inner peripheral surface of the outer ring.

In a class of this embodiment, bottoms of the positioning parts are provided with some second positioning slots configured to receive and position the coil springs.

Preferably, the rigid friction blocks are inclined at a certain angle in the radial directions of the inner and the outer ring of the power transmitting member. The first positioning slots configured to receive the rigid friction blocks are also inclined at the same angel, and the positioning parts of the rigid friction blocks are positioned in the first positioning slots. The compressed coil springs are disposed between the bottom of the rigid friction parts and the first positioning slots which are configured to receive the rigid friction blocks on the inner ring.

In a class of this embodiment, the locking ring is a separate structure, and comprises a plurality of unit locking sheets which are annularly disposed.

In a class of this embodiment, the lower end of the unit locking sheets is clung to the outer ring of ring gear to form the inner loop surface of the locking ring. The locking sheets' upper end which is elastically bended towards the same direction is the friction parts. The unit locking sheets are elastic metal sheets and their cross sections being like an arabic numeral 2, or a letter C or V.

In a class of this embodiment, supporting parts of the locking sheets are on the tail end which are opposite against the friction parts on the upper end of the locking sheets. The supporting parts are formed by bending the friction parts toward the upper end of the locking sheets, or by bending the tail end of adjacent unit locking sheets upward. The supporting parts which are bended upward are lower than the friction parts of adjacent locking sheets.

In a class of this embodiment, the unit locking sheets are composite elastic metal sheets with S-shaped or W-shaped cross section. Friction parts of the upper end parts of the locking sheets are connected to the fixing part on the lower end of the locking sheets via elastic connection parts which are continuously bended. The unit locking sheets are fixed on the outer ring surface of the ring gear via U-shaped positioning slots. The fixing parts of the locking sheets are soldered to the U-shaped positioning slots, and the U-shaped positioning slots are soldered to the outer ring surface through resistance welding or laser welding.

In a class of this embodiment, the locking ring is an integral structure, comprising an annular base. A plurality of bended friction parts on the upper end of locking sheets are formed by stamping the surface of the outer ring of the annular base towards one direction. The annular base under the friction parts is provided with punched holes. The outer ring surface of ring gear which is covered with the locking ring is provided with corresponding lug bosses through the punched holes to form supporting parts on the tail end of the locking sheets.

In a class of this embodiment, the band-type brake ring is a circular clamp ring. The unfixed end is driven by the gear shifting actuator to reduce the radius of the band-type brake ring; or when the gear shifting actuator is removed, the unfixed end relaxes and increases the radius of the band-type brake ring In a class of this embodiment, when the band-type brake ring is in a relaxed state, the elastic sheets or wedge blocks of the locking ring closely contact the inner surface of the annular lug boss on the planet carrier.

In a class of this embodiment, the gear shifting actuator could be a hydraulic cylinder, motor, solenoid valve, or hands of manipulator.

In a class of this embodiment, one end of the band-type brake ring is fixed on the transmission shell; another one which is connected to the gear shifting actuator is unfixed. The gear shifting actuator drives the unfixed end to reduce or increase the diameter of the band-type brake ring.

In a class of this embodiment, the band-type brake ring changes the speed through tension and relaxation. Under the effect of the gear shifting actuator, the radius of the brake ring is reduced, and then the inner surface of the brake ring is clung to the elastic sheets or the elastic wedge blocks on the outer surface of the locking ring, so when the radius decreases, the locking ring is separated from the inner ring surface of the planet carrier, thus the ring gear is separated from the inner ring surface of the planet carrier. Meanwhile, the locking ring and the ring gear stop rotating, and the sun gear directly drives the planet carrier to rotate via the dual planet gears, so as to realize transmission at a reduced speed. When the band-type brake ring is loosened and the diameter thereof increase, the locking ring is free from the band-type brake ring. The elastic force increases the radius R of the locking ring, and the elastic sheets or elastic wedge blocks on the locking ring closely contact with the inner surface of the annular lug boss on the planet carrier. Meanwhile, the ring gear is integrated with the planet carrier by the locking ring, and the sun gear drives the planet carrier to rotate at the same rate via the dual planet gears and the ring gear, so as to realize direct transmission and shift from the first gear to the second gear. It is worth mentioning that a reliable connection between the elastic sheets or elastic wedge blocks on the locking ring and the inner ring surface of the planet carrier is formed because of friction and self-locking.

In a class of this embodiment, the transmission comprises a control module for automatic gear shifting. The control module detects the speed of wheel and motor. Once the speed of electric vehicle reaches a set value, the control module sends an order to the actuator, and the brake ring is tensioned or loosened. Correspondingly, the radius of the locking ring is reduced or increased. The locking ring contacts with the planet carrier or is free from it, so that the ring gear is either fixed on the transmission shell, or is fixed connected to the planet carrier, thus the gear is shifted.

In a class of this embodiment, because the gear ratio of the dual planet gears is adjustable, the transmission ratio of the transmission varies within a much wide range than the transmission with single planet gear.

Compared with conventional technologies, the advantages of the two-speed automatic planetary transmission are as follows:

1. The connection and disconnection between the ring gear and the planet carrier are controlled via the locking ring and the brake ring, so that the clutch, synchronizer, and gear shifting devices are omitted, and automatic transmission is fully realized.

2. The transmission comprises a planetary gear train, a locking ring, and a brake ring, thus the transmission has the features of simple structure, few parts, small volume and light weight.

3. The transmission is able to change the transmission ratio of the system to enlarge the application of the transmission by adjusting the gear ratio of the dual planet gears, while the sun gear and ring gear is unchanged.

4. The brake ring is tensioned or loosened to control the locking between the locking ring and the ring gear, so as to change speed. So the control response fast and smooth motion without impact.

DETAILED DESCRIPTION OF THE EMBODIMENTS

Figure 1:
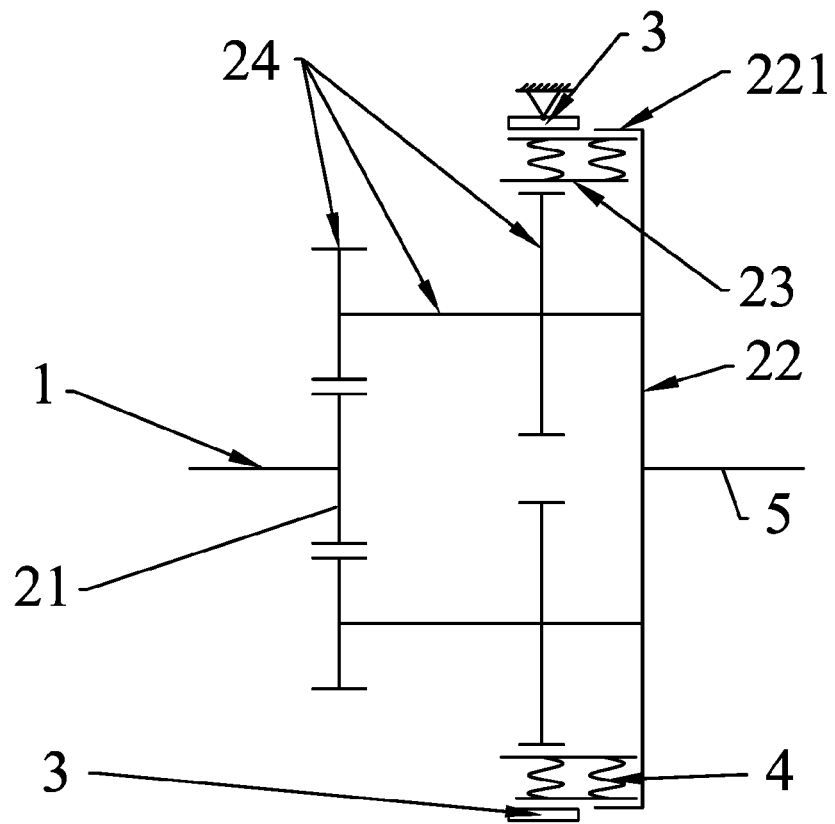
FIG. 1 is a schematic diagram of a two-speed automatic planetary transmission in accordance with one embodiment of the invention.
Figure 2:
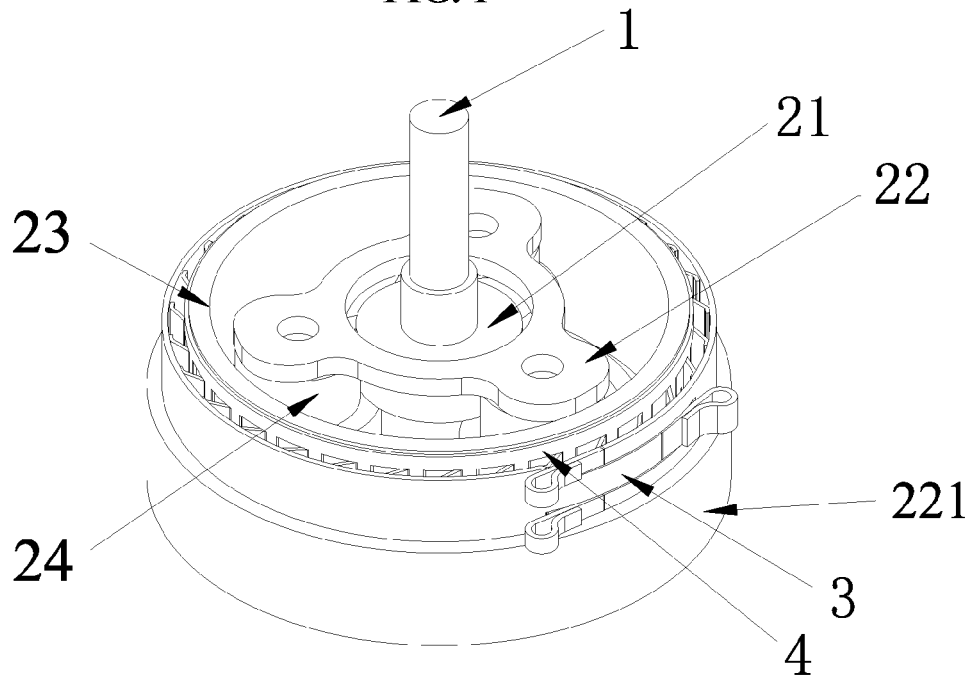
FIG. 2 is a stereogram of the a two-speed automatic planetary transmission in accordance with one embodiment of the invention.
Figure 3:
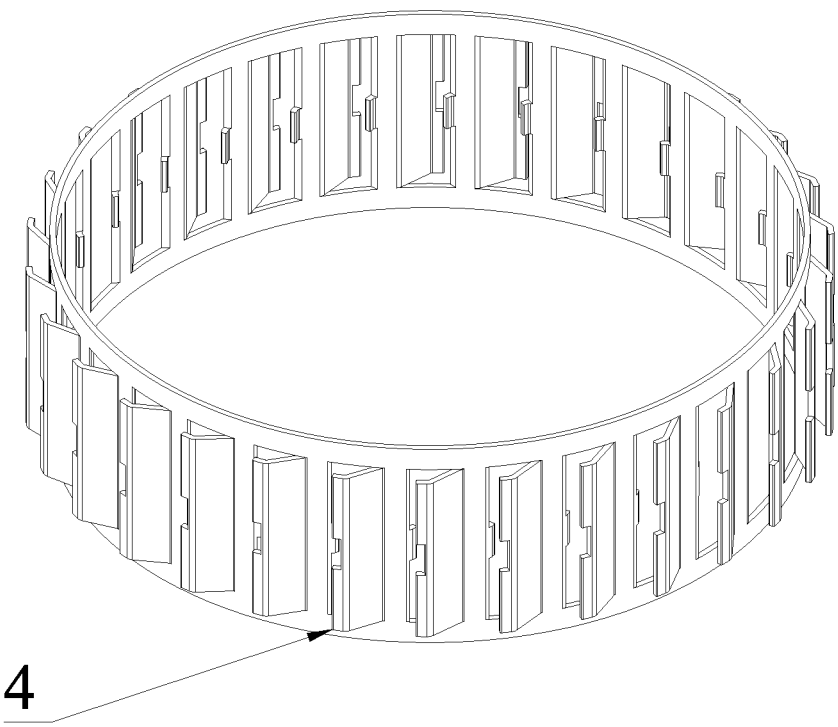
FIG. 3 is a schematic diagram of a locking ring of a two-speed automatic planetary transmission in accordance with one embodiment of the invention.
Figure 4:
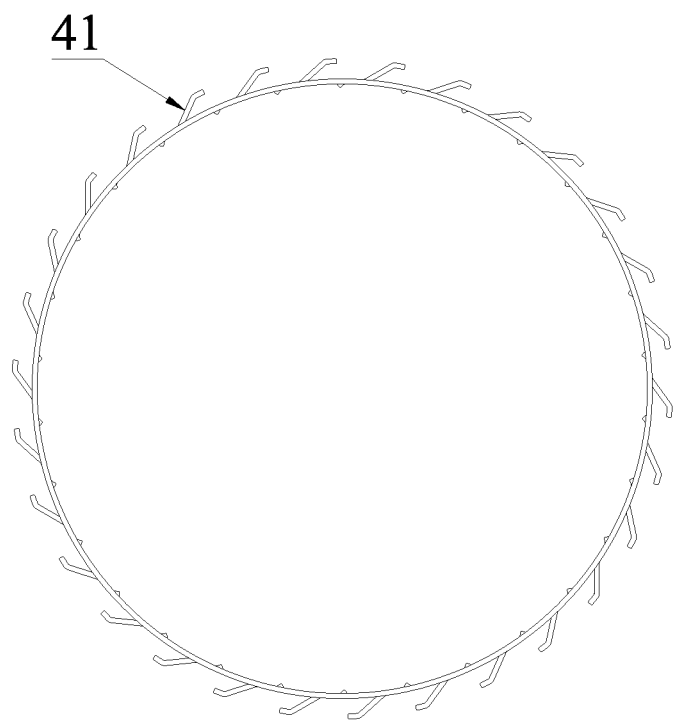
FIG. 4 is a schematic diagram of a locking ring of a two-speed automatic planetary transmission in Example 1.
Figure 5:
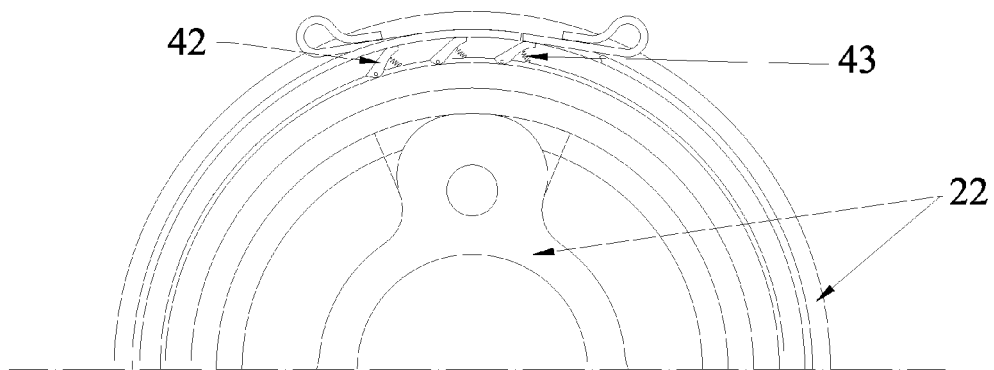
FIG. 5 is a schematic diagram of a locking ring a two-speed automatic planetary transmission in Example 2.
Figure 6:
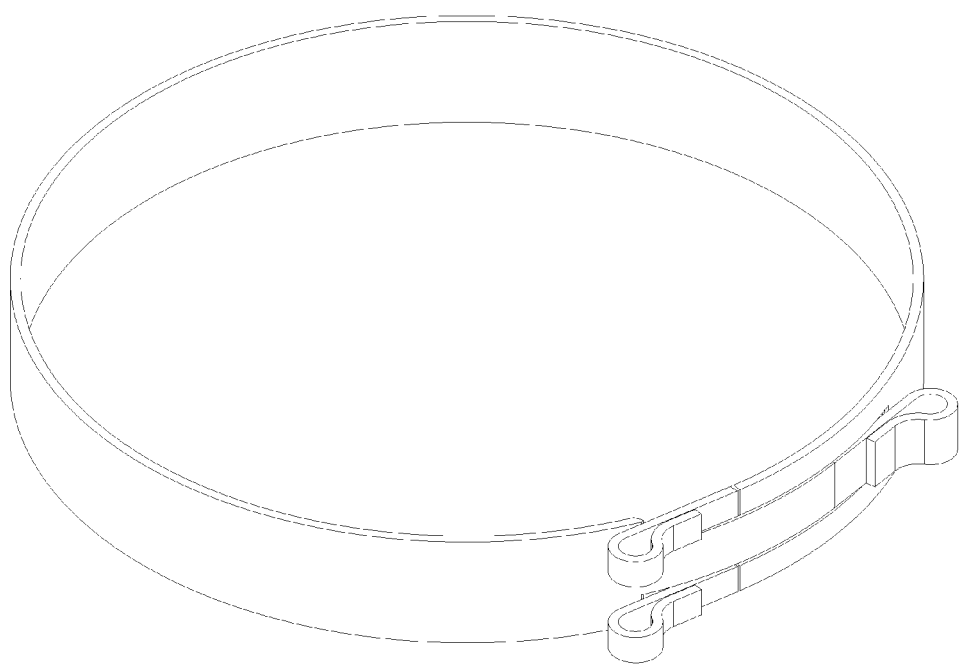
FIG. 6 is a schematic diagram of a band-type brake ring of a two-speed automatic planetary transmission in accordance with one embodiment of the invention.
Figure 7:
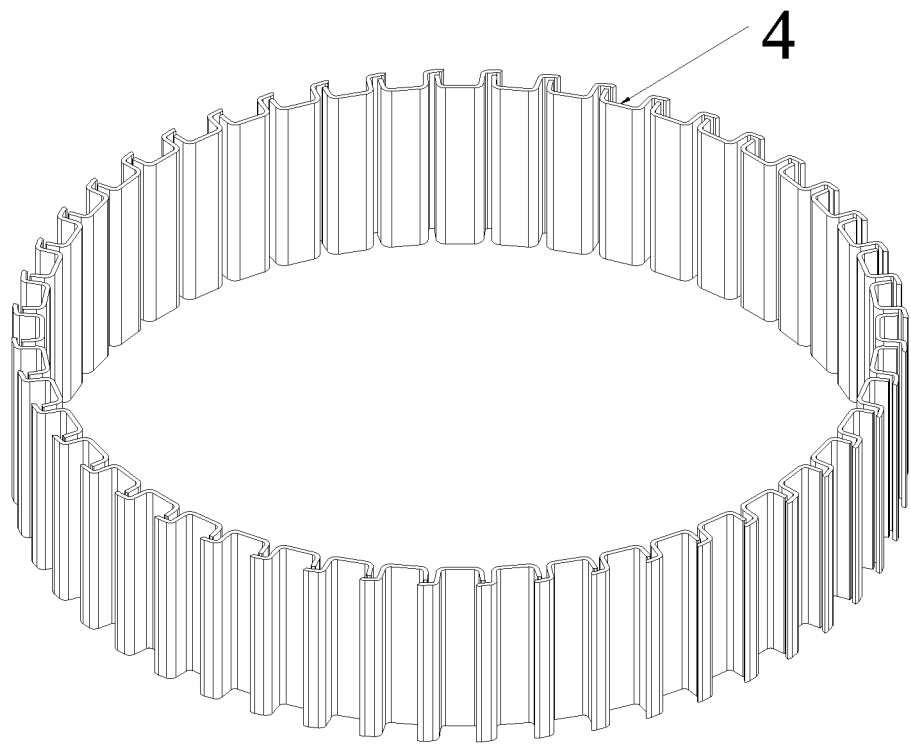
FIG. 7 is a stereogram of a locking ring of a two-speed automatic planetary transmission in Example 3.

For further illustrating the invention, experiments detailing a two-speed automatic planetary transmission are described below. It should be noted that the following examples are intended to describe and not to limit the invention.

Example 1

As shown in FIGS. 1, 2, 3, 4, and 6, a two-speed automatic planetary transmission comprises a sun gear 21, dual planet gears 24, a planet carrier 22, a ring gear 23, a band-type brake ring 3, and a locking ring 4. One end of the planet carrier 22 is provided with an output shaft 5, and another end is provided with the dual planet gears 24. One of the dual planet gears is engaged with the sun gear 21, and another is engaged with the ring gear 23. The sun gear 21 comprises an input shaft 1. The planet carrier 22 is provided with an annular lug boss 221. The locking ring 4 is disposed between the outer surface of the ring gear 23 and the inner surface of the annular lug boss 221, and the inner surface of the locking ring 4 is fixedly connected to the outer surface of the ring gear 23. Part of the outer surface of the locking ring 4 contacts the inner surface of the annular lug boss 221, and another part thereof is sheathed with the band-type brake ring 3. One end of the band-type brake ring 3 is fixed to the transmission shell, and another end thereof is an unfixed end, and is connected to a gear shifting actuator.

The locking ring comprises elastic sheets 41 which are raised up from and equally distributed on the outer surface of the locking ring 4. The locking ring 4 is made from spring steel. The elastic sheets 41 are shaped by stamping process.

The band-type brake ring 3 is a circular clamp ring. The unfixed end is driven by the gear shifting actuator to reduce the radius of the band-type brake ring 3, so that the band-type brake ring 3 is able to enclasp the locking ring 4; or when the gear shifting actuator is removed, the unfixed end's relaxation can increase the radius of the band-type brake ring 3, so that the locking ring 4 is free from the band-type brake ring 3, meanwhile, the elastic sheets 41 on the locking ring 4 compress the band-type brake ring 3 and closely contact with the inner surface of the annular lug boss 221 disposed on the planet carrier 22.

Example 2

As shown in FIGS. 1, 2, 3, 5, and 6, the two-speed automatic planetary transmission in this example is basically the same as that in Example 1 except the following differences.

Wedge blocks 42 are equally hinged on the locking ring 4, and the wedge blocks 42 are raised up from the outer surface of the locking ring 4. The wedge blocks 42 are embedded in the locking ring 4. The wedge blocks 42 are compressed on the inner surface of the annular lug boss 221 disposed on the planet carrier 22 via springs 43, which is similar to conventional one-way clutch.

The band-type brake ring 3 is a circular clamp ring. The unfixed end is driven by the gear shifting actuator to reduce the radius of the band-type brake ring 3, so that the band-type brake ring 3 is able to enclasp the locking ring 4; or when the gear shifting actuator is removed, the unfixed end's relaxation will increase the radius of the band-type brake ring 3, so that the locking ring 4 is free from the band-type brake ring 3.

A speed of electric vehicle is inputted from the input shaft 1, passing to the sun gear 21 and the dual planet gears 24 in sequence, and then is outputted to the output shaft 5 via the planet carrier 22. Connection and disconnection between the ring gear 23 and the planet carrier 22 are controlled via the locking ring 4 and the brake ring 3, thus two working conditions are formed, so as to change speed.

In Example 2, the wedge blocks 42 on the locking ring 4 are able to be compressed and restored via the springs 43. When the band-type brake ring 3 is tensioned, the radius of the brake ring 3 is reduced, and the outer surface of the wedge blocks 42 are separated from the inner surface of the annular lug boss 221 disposed on the planet carrier 22. When the band-type brake ring 3 is loosened and the radius thereof is increased, the outer surface of the wedge blocks 42 closely contact with the inner surface of the annular lug boss 221 disposed on the planet carrier 22. It is worth mentioning that a reliable connection between the wedge blocks 42 and the inner surface of the annular lug boss 221 of the planet carrier 22 is formed because of friction self-locking as the system rotates along a certain direction.

It is understandable to those skilled in the art that the gear shifting actuator is a hydraulic cylinder, motor, solenoid valve, or hands of manipulator.

Example 3

Figure 8:
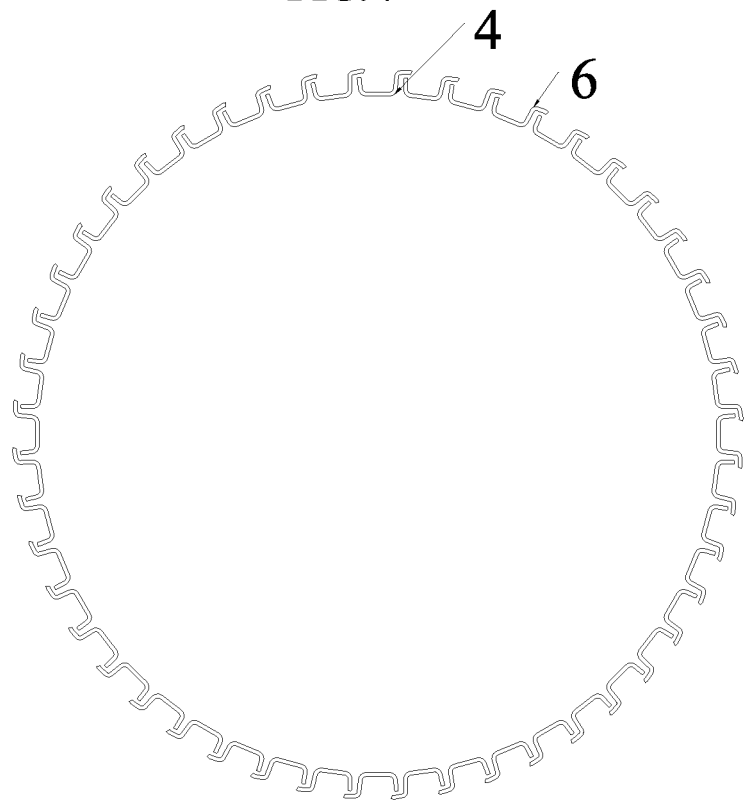
FIG. 8 is a top view of a locking ring of a two-speed automatic planetary transmission in Example 3.
Figure 9A:
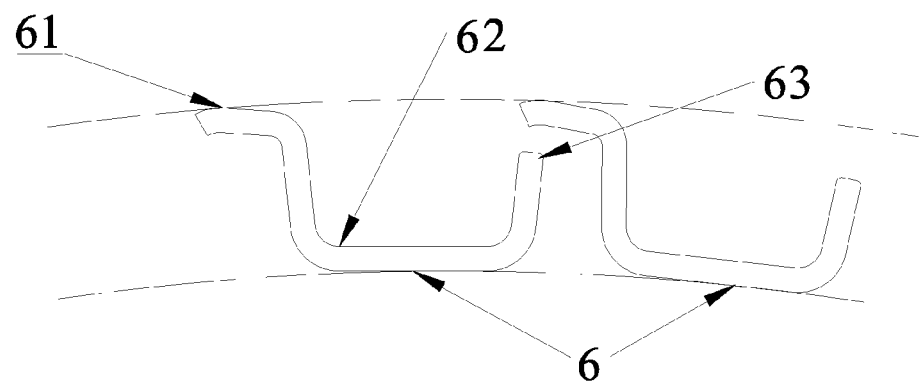
FIGS. 9A, 9B, and 9C are schematic diagrams of three shapes of unit locking sheets of a two-speed automatic planetary transmission in Example 3.

As shown in FIGS. 1 and 8, the locking ring 4 is a separate structure, and comprises a plurality of unit locking sheets 6 which are annularly disposed. One of the unit locking sheets 6 is shaped by stamping an elastic metal sheet. As shown in FIG. 9A, a cross-section of the unit locking sheet 6 is like an arabic numeral 2 via stamping, and fixing parts 62 on the lower end of the unit locking sheet 6 is soldered to the outer ring surface of a power transmitting member (such as the ring gear 23 in Example 1) through resistance welding or laser welding, so as to form an inner loop surface of the locking ring. Supporting parts 63 of the locking sheets are on the tail end which are opposite end against the friction parts 62 on the lower end of the locking sheet. The supporting parts 63 are formed by bending toward the friction parts 62 on the upper end of locking sheets, or by bending the tail end of adjacent unit locking sheets upward. The supporting parts 63 which are bended upward are lower than friction parts 62 of adjacent locking sheets.

Figure 9B:
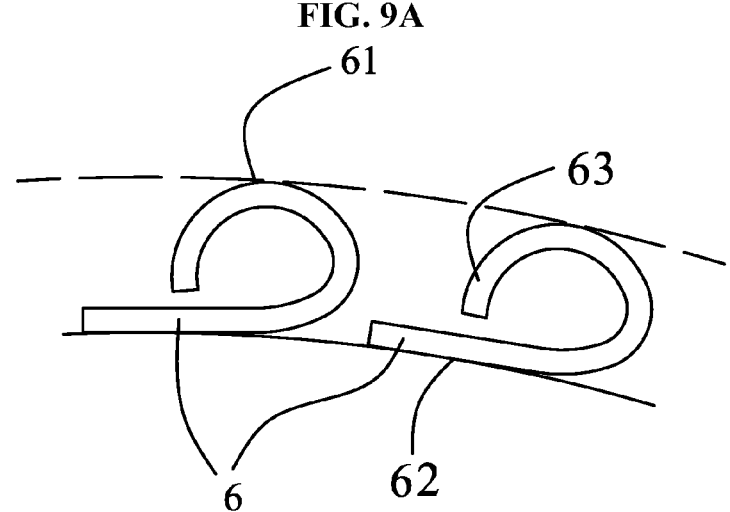

As shown in FIG. 9B, the locking sheets 6 are stamped into C-shaped cross sections. The fixing parts 62 on the lower end are longer than that on the upper end, and the friction parts 61 on the upper end of the locking sheet are bended upward. The friction parts 61 on the upper ends continue to be bended down to form supporting parts 61 on the tail end of the locking sheets.

Figure 9C:
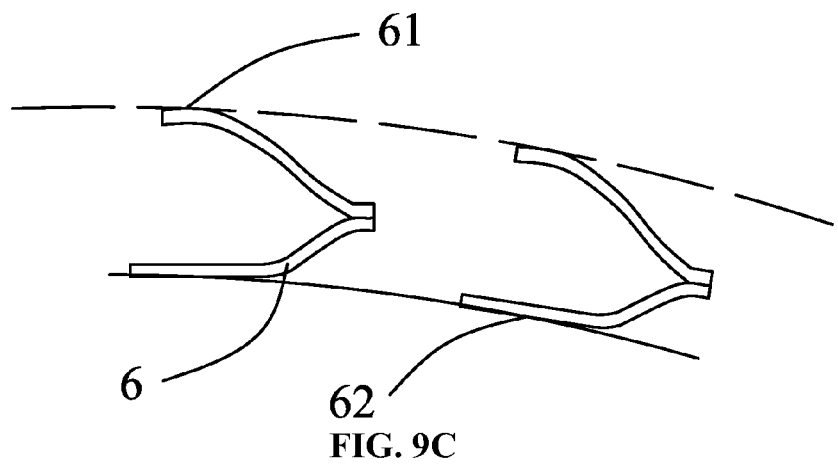

As shown in FIG. 9C, the locking sheets 6 are stamped into V-shaped cross sections. Two ends of the V-shaped elastic sheets are convex and are corresponding to the friction parts 61 on the upper end of the locking sheet and fixing parts 62 on the lower end of the locking sheets, respectively. While supporting parts on the tail end of the locking sheets can also be disposed on the locking sheets, FIG. 9C shows locking sheets not supported by any supporting part, so as to demonstrate that the locking ring is not supported.

Example 4

Figure 10A:
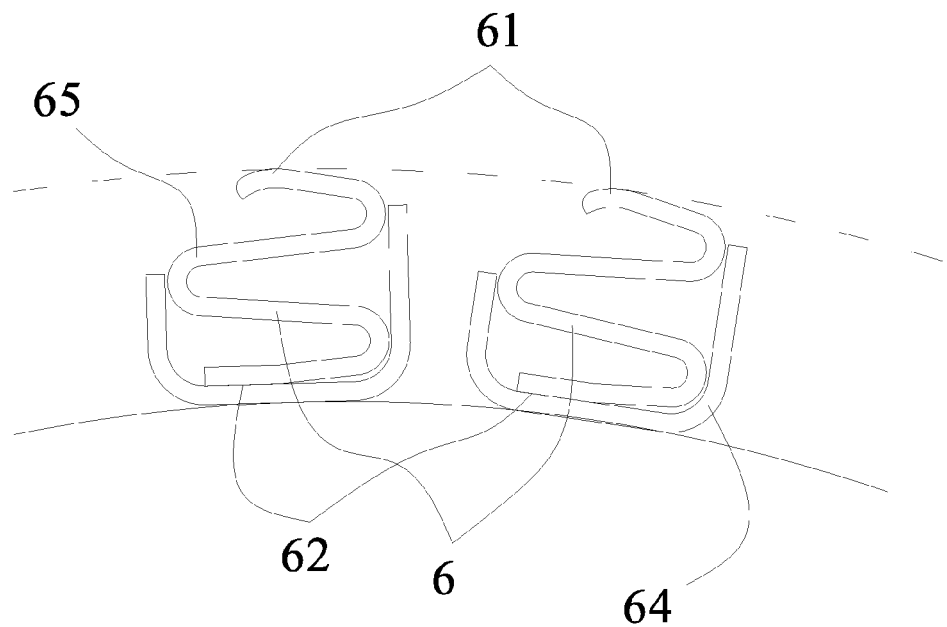
FIGS. 10A and 10B are schematic diagrams of two shapes of unit locking sheets of a two-speed automatic planetary transmission in Example 4.
Figure 10B:
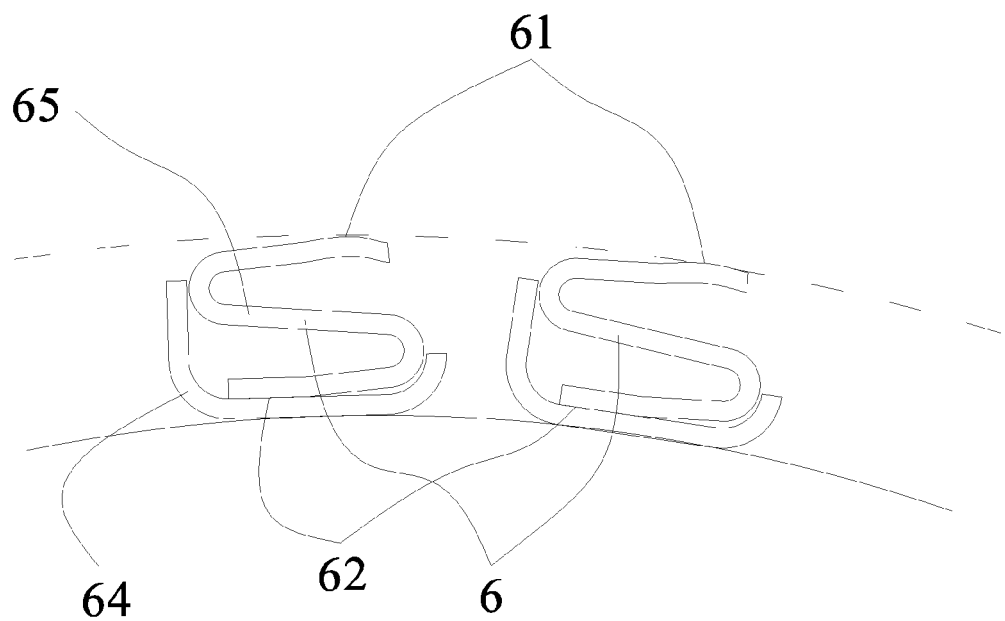

As shown in FIGS. 10A-10B, the unit locking sheets 6 are composite elastic metal sheets with S-shaped or W-shaped cross-section. The friction parts 61 on the upper end of the locking sheets are connected to the fixing parts 62 on the lower end of the locking sheets via elastic connection parts 65 which are continuously bended. The connection parts 65 increase the overall length of the locking sheets, and decrease the spring stiffness of the shaped unit locking sheets.

The unit locking sheets 6 are fixed on the outer ring surface of a power transmitting member via U-shaped positioning slots 64. The fixing parts 62 of the locking sheets are soldered to the U-shaped positioning slots 64, and the U-shaped positioning slots are soldered to the outer ring surface of the power transmitting member through resistance welding or laser welding. The positioning slots 64 are made from U-shaped steel slots which have certain stiffness. The positioning slots 64 are lower than the friction parts 61. The positioning slots 64 can work as the supporting parts on the tail end of unit locking sheets as in Example 1, and avoid adverse plastic deformations of friction parts 61 on the upper end of the locking sheets.

Example 5

Figure 11:
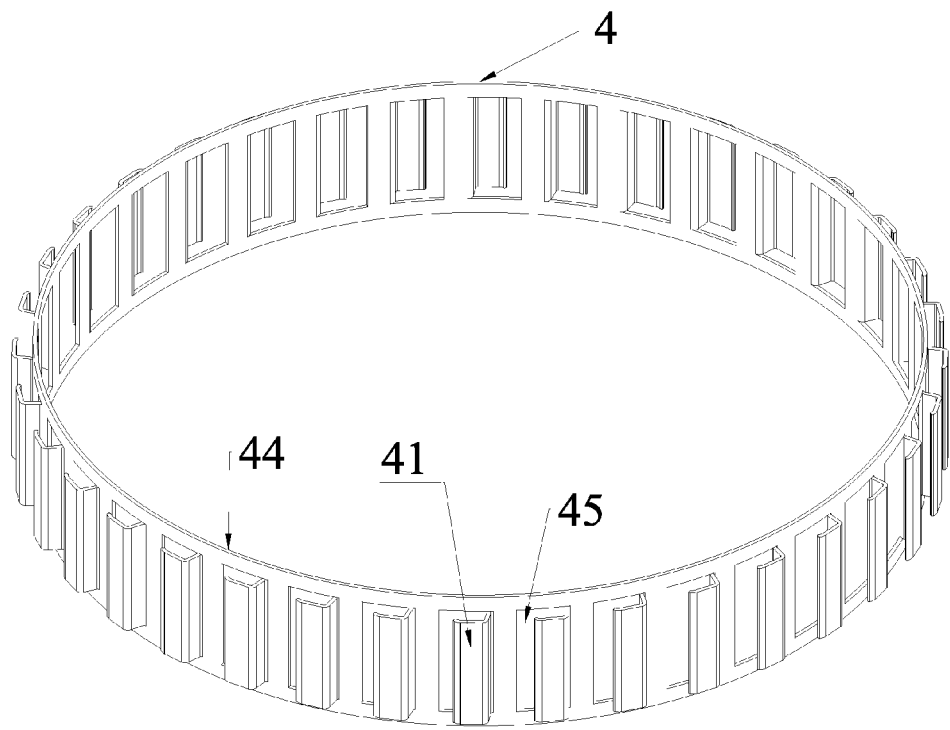
FIG. 11 is a stereogram of a locking ring of a two-speed automatic planetary transmission in Example 5.
Figure 12:
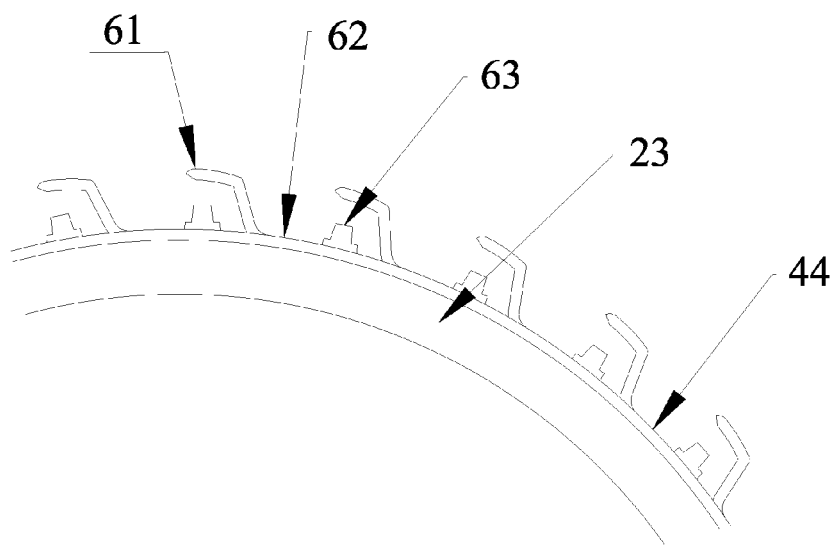
FIG. 12 is a top view of a locking ring of a two-speed automatic planetary transmission in Example 5.

As shown in FIGS. 11-12, the locking ring 4 is an integral structure, comprising an annular base 44. A plurality of bended elastic sheets 41 are formed by stamping a surface of the outer ring surface of the annular base towards one direction. The elastic sheets 41 have the same function as the friction parts 61 of the unit locking sheets having 2-shaped cross-sections in Example 3. The annular base 44 under the elastic sheets is provided with punched holes 45. Supporting parts on the tail end of the locking sheets are able to be disposed on the annular base 44 through the punched holes 45. The annular base 44 is sleeved on a power transmitting member, and is functioned as fixing parts 62 on lower parts of the locking sheets.

As shown in FIG. 12, the outer ring surface (such as the ring gear 23 in Example 1) of the power transmitting member which is sheathed in the annular base 44 of the locking ring 4 is provided with corresponding lug bosses which pass through the punched holes 45 on the annular base 44 to form supporting parts 63, just like the supporting parts of the unit locking sheets. The elastic sheets 41 on the locking ring 4 are functioned as friction parts 61, and the annular base 44 is functioned as fixing part 62 of the integral structure.

Example 6

Figure 13:
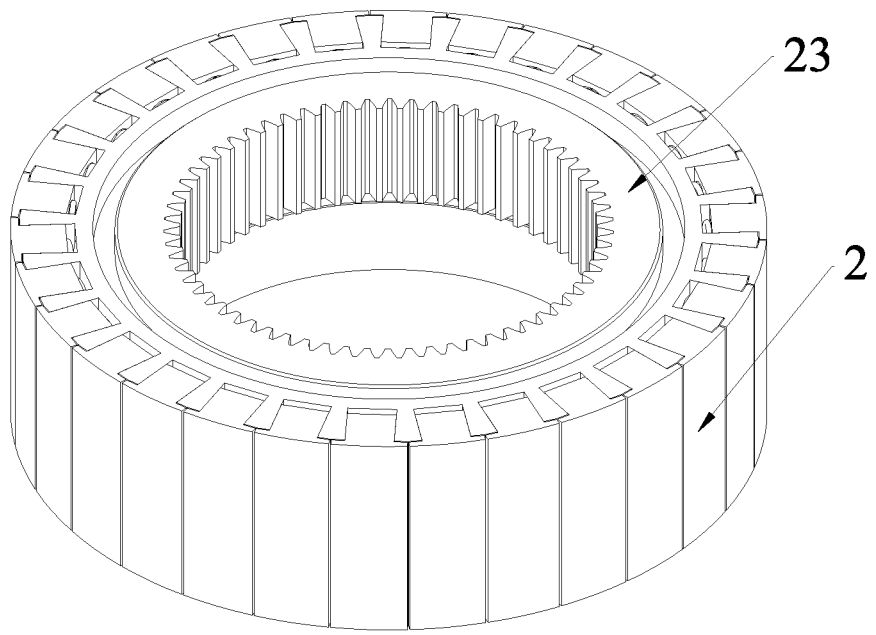
FIG. 13 is a stereogram of a ring gear and a locking ring of a two-speed automatic planetary transmission in Example 6.
Figure 14:
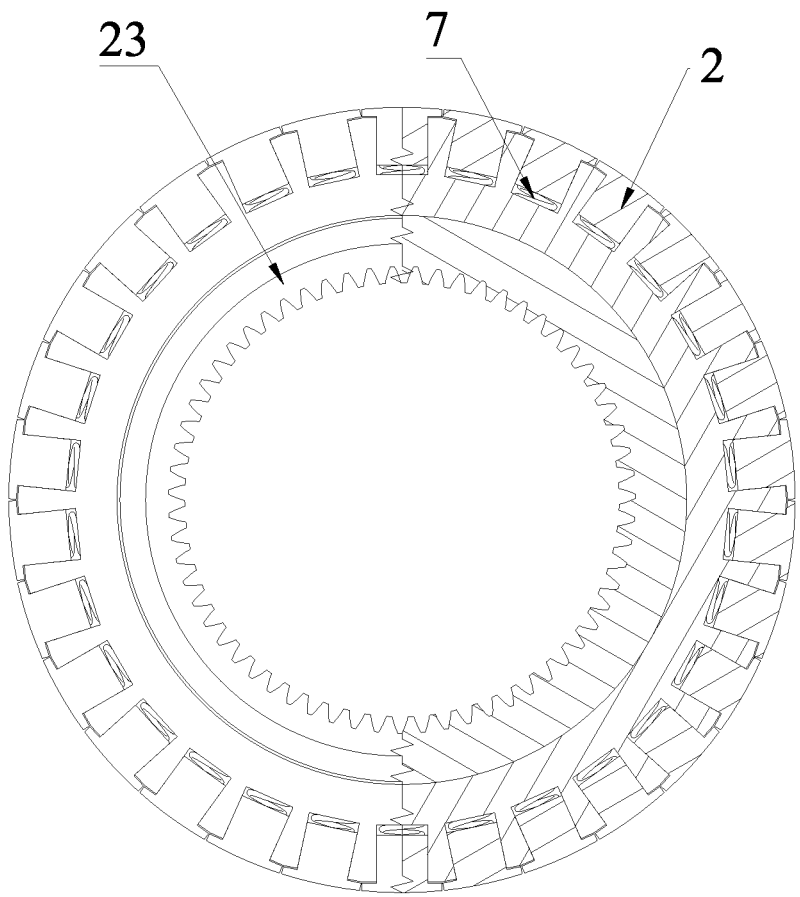
FIG. 14 is half-sectional view of a ring gear and a locking ring of a two-speed automatic planetary transmission in Example 6.

As shown in FIGS. 13-14, the locking ring is disposed between the inner ring and the outer ring of a power transmitting member which coaxially transmits rotational motion or torque. In the example, the inner ring is the ring gear 23, and the outer ring is an inner ring surface of the planet carrier which is unnecessary to be specifically explained in this example.

Figure 15:
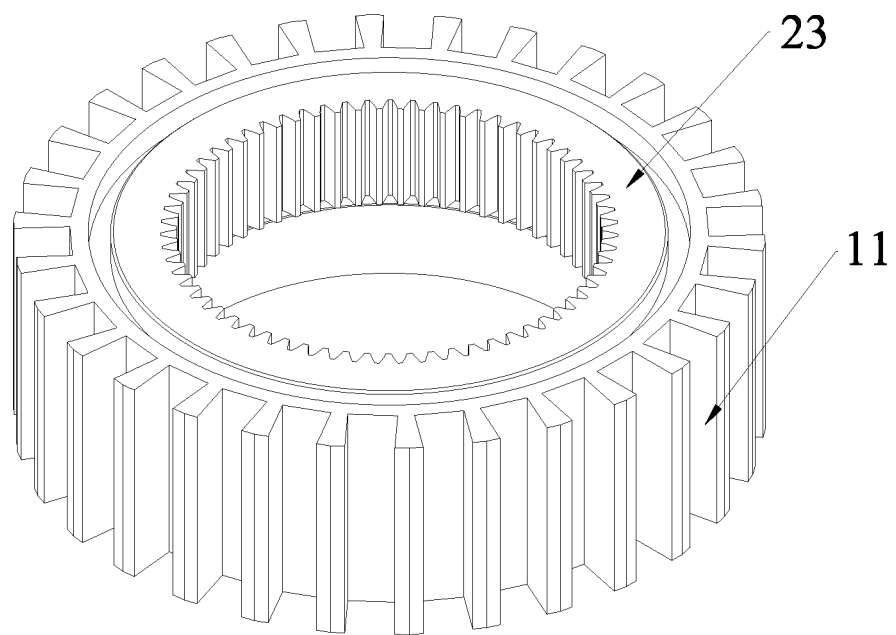
FIG. 15 is schematic diagram of a ring gear and positioning slots of a two-speed automatic planetary transmission in Example 6.
Figure 16:
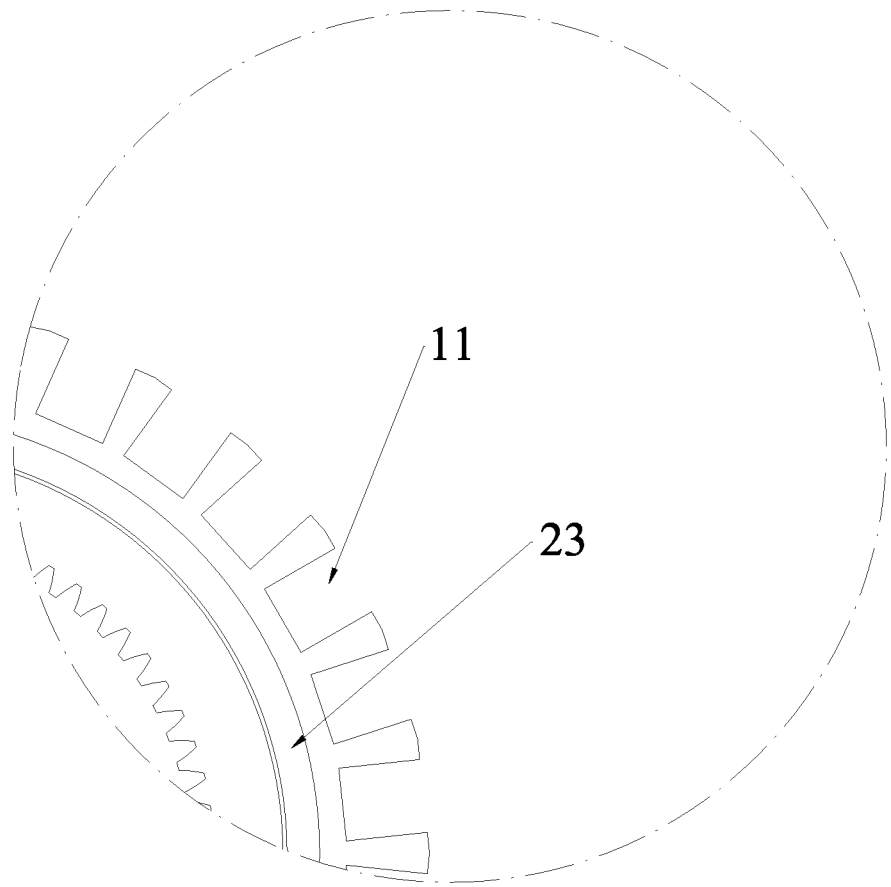
FIG. 16 is a partial enlargement of a ring gear and positioning slots of a two-speed automatic planetary transmission in Example 6.

Specifically, the locking ring comprises a plurality of rigid friction blocks 2, and the rotational motion or torque between the ring gear and the planet carrier is transmitted via friction. As shown in FIGS. 15-16, a plurality of first positioning slots 11 are equally distributed on an outer surface of the ring gear 23. Either, the first positioning slots 11 are milled together with the ring gear, or these processed annular components of positioning slots are employed and soldered on the outer surface of the ring gear.

Figure 17:
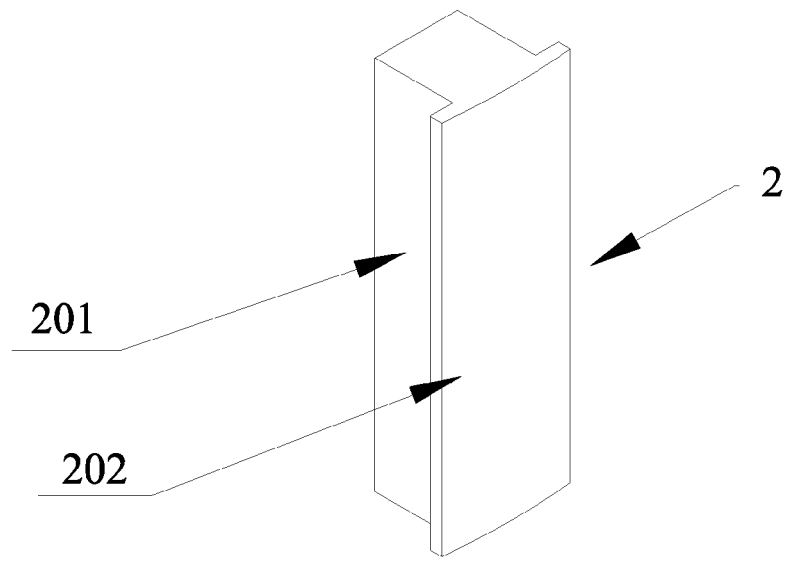
FIG. 17 is a stereogram of a rigid friction block of a two-speed automatic planetary transmission in Example 6.
Figure 18:
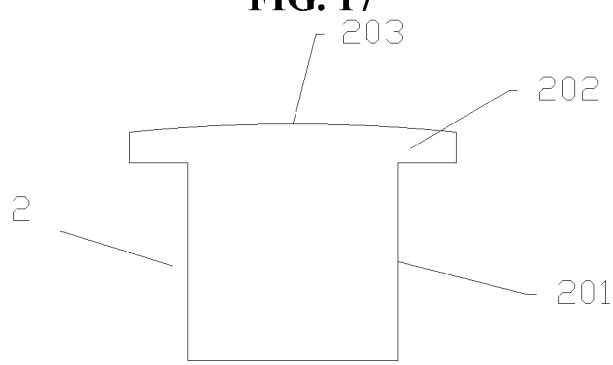
FIG. 18 is a cross-sectional view of a rigid friction block of a two-speed automatic planetary transmission in Example 6.
Figure 19:
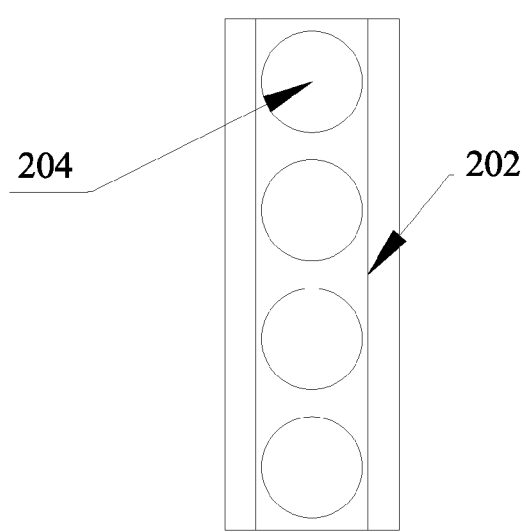
FIG. 19 is a diagram of a rigid friction block and positioning slots for springs of a two-speed automatic planetary transmission in Example 6.
Figure 20:
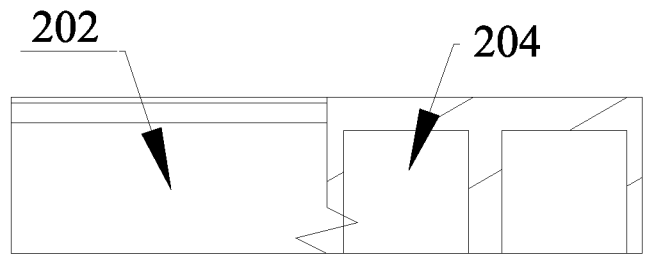
FIG. 20 is a half-sectional view of a rigid friction block and positioning slots for springs of a two-speed automatic planetary transmission in Example 6.
Figure 21:
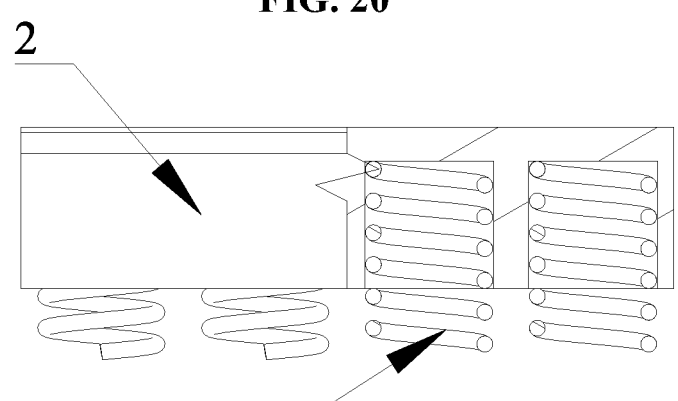
FIG. 21 is a diagram of a rigid friction block and coil springs of a two-speed automatic planetary transmission in Example 6.

As shown in FIGS. 17-18, the rigid friction blocks are rigid metal blocks having certain friction coefficients. The rigid friction blocks are positioned in the first positioning slots 11 of the ring gear. In the example, cross sections of the rigid friction blocks 2 are T-shaped, and are vertical to tangents of the outer surface of the ring gear. The rigid friction blocks are ensured to vertically contact with the inner ring of the planet carrier. Narrow parts of the T-shaped rigid friction blocks are the positioning parts 201, and are positioned in the first positioning slots 11; wide parts of the T-shaped rigid friction blocks are the friction parts 202. Compressed coil springs 7 are disposed between the positioning parts 201 and the first positioning slots 11 to compress the friction parts 202 of the rigid friction blocks on the surface of inner surface of the outer ring of the power transmitting member. As shown in FIGS. 19-20, bottoms of the positioning parts 201 are provided with a plurality of second positioning slots 204 configured to receive and position the coil spring 7, avoiding the displacement of the coil springs. As shown in FIG. 21, number of the second positioning slots for coil springs is determined by the number of the coil springs needed.

Cross-section of the rigid friction blocks is T-shaped. Friction parts 202 are connected and form a complete circle on the outer side of the outer surface of the gear ring 23. Upper surface of the friction parts 202 is designed to be arc surfaces, so as to improve contact area with the inner ring of planet carrier, thus improving transmission stability.

Figure 22:
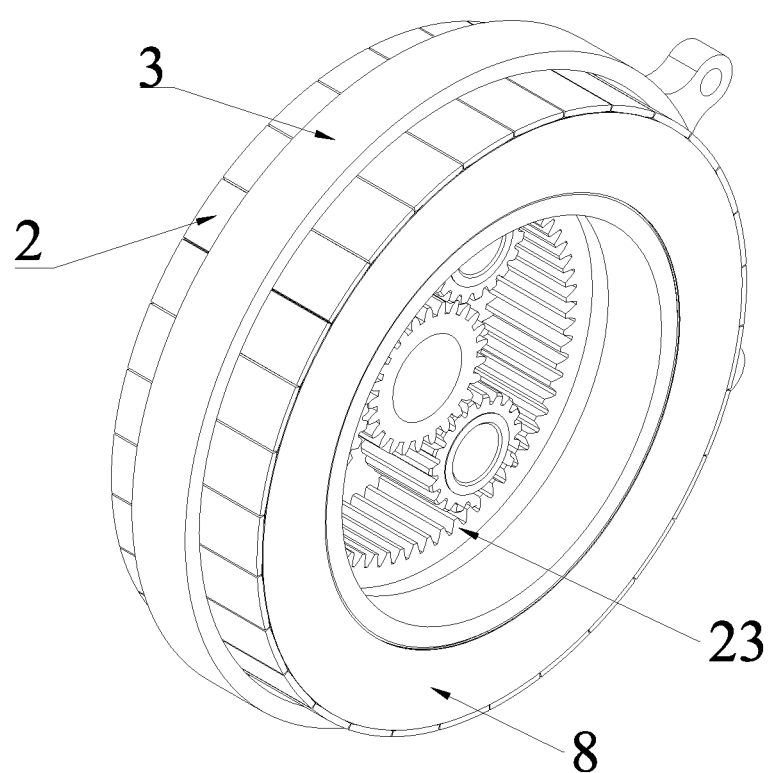
FIG. 22 is a stereogram of a ring gear, a locking ring, and a brake ring of a two-speed automatic planetary transmission in Example 6.
Figure 23:
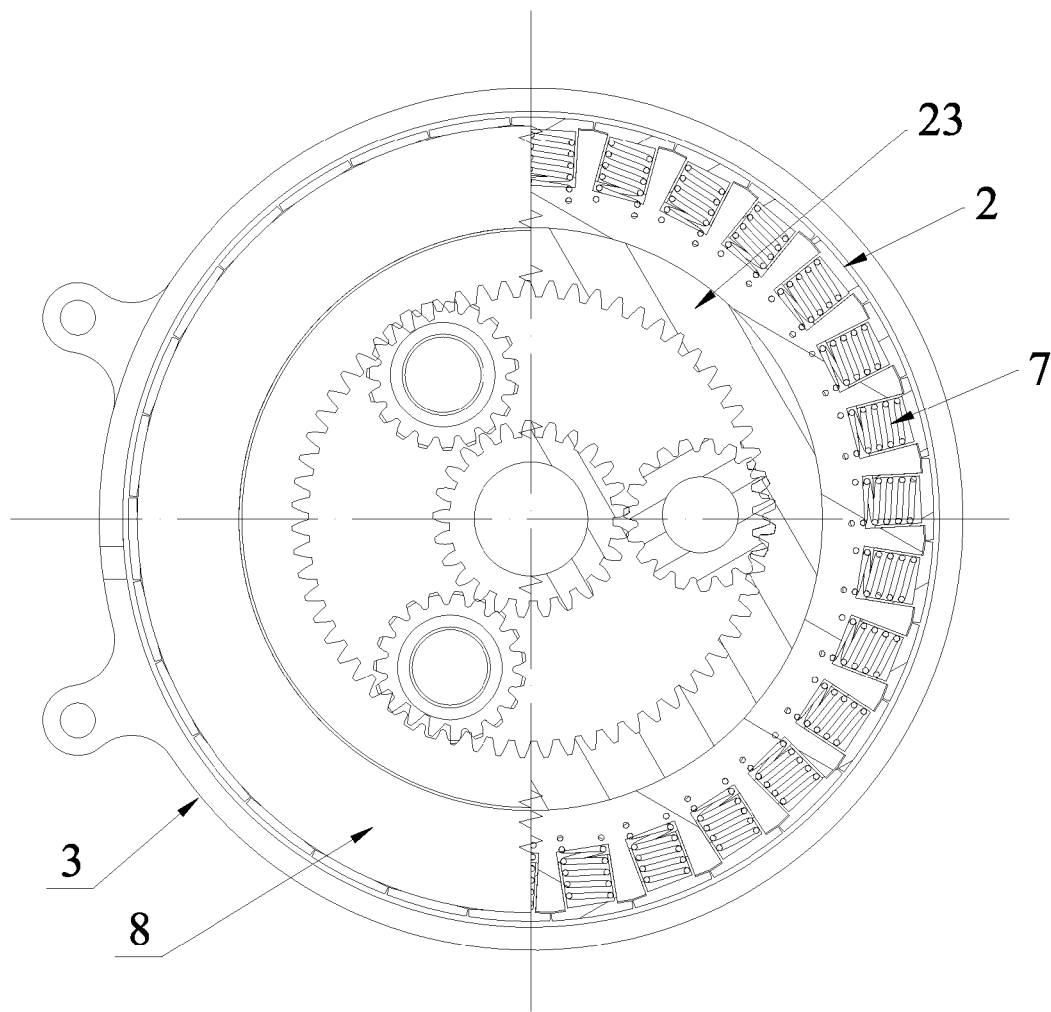
FIG. 23 is a half-sectional view of a ring gear, a locking ring, and a brake ring of a two-speed automatic planetary transmission in Example 6.

As shown in FIGS. 22-23, end surfaces of two sides of the ring gear 23 are provided with axial baffles 8, so as to avoid axial displacement of the rigid friction blocks 2. Annular plates of the axial baffles 8 are soldered on the end surface of the ring gear. Outer surface of the axial baffles could not exceed the friction parts of the rigid friction blocks, so that the rigid friction blocks 2 are limited in the positioning slots of the ring gear.

Figure 24:
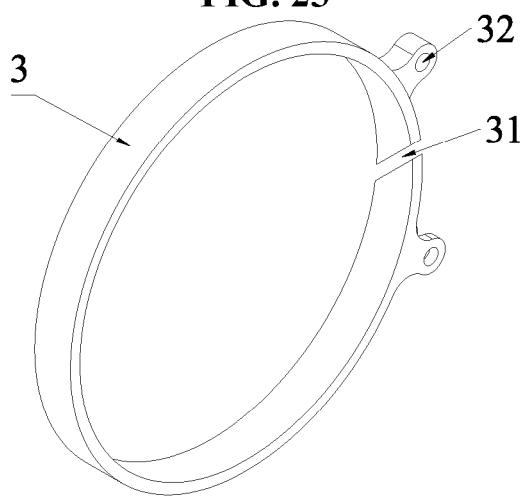
FIG. 24 is a stereogram of a brake ring of a two-speed automatic planetary transmission in Example 6.

A non-contact part between the friction parts 202 of the rigid friction blocks 2 and the inner ring of the planet carrier is provided with a band-type brake ring 3 which is adapted to be tensioned and relaxation. The band-type brake ring 3 is disposed on the non-contact part, thus the transmission is not affected. As shown in FIG. 24, the band-type brake ring is an elastic annular component comprising a crevice 31. Two sides of the crevice 31 are provided with tensioning parts 32 to tension the brake ring. The tensioning parts 32 are two soldered ears, so as to connect with the executive component of a shifting mechanism of the transmission.

The band-type brake ring 3 is driven by an actuator which is tensioned and loosened to control the rigid friction blocks of the locking ring, so that the rigid friction blocks of the locking ring contact (or are separated from) with the inner ring surface of the planet carrier, thus the gear is shifted.

When the brake ring 3 is tensioned, the arc surfaces 203 of the friction parts of the rigid friction blocks 2 are compressed, and the coil springs are compressed, so the circular friction surface formed by the arc surfaces 203 of the rigid friction blocks 2 is separated from the inner surface of the planet carrier. The transmission is in the first working state. Planet gears are adapted to transmit torque between the ring gear and the planet carrier, and the transmission is weak. When the brake ring 3 is loosened, the rigid friction blocks 2 are springed up by the coil springs 7, and move outward along radial directions in the first positioning slots 11. The friction parts of the rigid friction blocks 2 contact with the inner surface of the inner ring of the planet carrier. The transmission is in the second working state. The gear ring is integrated with the planet carrier and transmits torque, and the transmission is strong. By shifting the working states, the transmission could shift transmission ratios between two speeds.

Example 7

Figure 25:
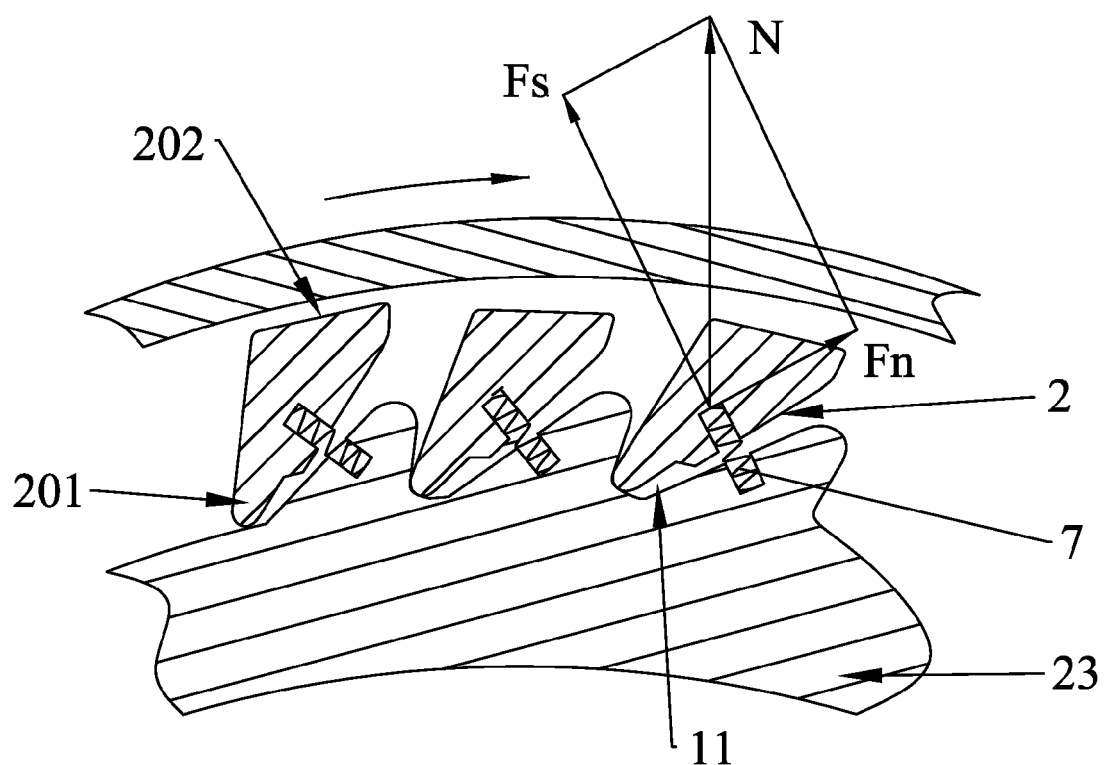
FIG. 25 is a schematic diagram of a ring gear and a locking ring of a two-speed automatic planetary transmission in Example 7.

Following the basic structure in Example 1, as shown in FIG. 25, the rigid friction blocks 2 are inclined to the radial directions of the ring gear and the inner ring of the planet carrier of a power transmitting member at a certain angle. The first positioning slots 11 are also inclined at the same angel, and the positioning parts 201 of the rigid friction blocks 2 are positioned in the first positioning slots 11. The compressed coil springs 7 are disposed between the first positioning slots 11 on the ring gear and the bottom of the friction parts 202 of the rigid friction parts 2.

As shown in FIG. 25, in the example, a force Fn is formed between the friction parts 202 and the outer ring, and the coil springs have an elastic force Fs on the friction parts 202. A resultant (normal stress) N of Fn and Fs is vertical to tangents of the ring gear and the inner ring of the planet carrier of a power transmitting member. In comparison with Example 1, during the torque transmission, while the normal stress N is the same, the elastic force Fs of springs on the friction parts of the example is much smaller, thus the spring stiffness needed is smaller, and the number of spring could be largely reduced. To be specific, for example, four springs are needed for each rigid friction block in Example 1, and only one spring is enough for each friction block in Example 2.

Because the coil springs in the example are inclined, the bottom of the friction parts 202 and the first positioning slots 11 are respectively provided to avoid displacement of the coil springs with a plurality of second positioning slots 204 configured to receive and locate the coil spring 7.

On the basis of Example 6 and Example 7, the locking ring is effectively applied on the two-speed automatic planetary transmission. The rigid friction blocks are positioned in the positioning slots disposed on the outer surface of the gear ring. The rotational motion and torque are transmitted by compressing the coil springs or loosening them. The brake ring which is employed to control the gear shifting is connected to the actuator of the transmission.

It is understandable to those people familiar with this field that the gear shifting actuator is anyone selected from hydraulic cylinder, motor, solenoid valve, or hands of manipulator.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A two-speed automatic planetary transmission, comprising:
   a) a sun gear, the sun gear comprising an input shaft;
   b) dual planet gears;
   c) a planet carrier, the planet carrier comprising an output shaft and an annular lug boss;
   d) a ring gear;
   e) a band-type brake ring; and
   f) a locking ring;
   wherein
   the output shaft and the dual planet gears are disposed at two opposite end surfaces of the planet carrier, respectively;
   one of the dual planet gears is engaged with the sun gear, and another planet gear is engaged with the ring gear;
   the locking ring is disposed between an outer surface of the ring gear and an inner surface of the annular lug boss, and an inner surface of the locking ring is fixedly connected to the outer surface of the ring gear;
   part of an outer surface of the locking ring contacts the inner surface of the annular lug boss, and another part thereof is sheathed with the band-type brake ring; and
   one end of the band-type brake ring is a fixed end, which is fixedly connected to a transmission shell, and another end thereof is an unfixed end, which is connected to a gear shifting actuator.

2. The transmission of claim 1, wherein the locking ring comprises elastic sheets which are raised up from and equally distributed on the outer surface of the locking ring.

3. The transmission of claim 2, wherein the locking ring is made from spring steel; the elastic sheets are shaped by stamping process.

4. The transmission of claim 3, wherein the band-type brake ring is a circular clamp ring; the unfixed end of the band-type brake ring is driven by the gear shifting actuator to decrease a radius of the band-type brake ring; or when the gear shifting actuator is removed, the unfixed end's relaxation increases the radius of the band-type brake ring; when the band-type brake ring is in a relaxed state, the elastic sheets on the locking ring closely contact the inner surface of the annular lug boss disposed on the planet carrier; the gear shifting actuator is a hydraulic cylinder, motor, or solenoid valve.

5. The transmission of claim 1, wherein the locking ring comprises wedge blocks which are raised up from and equally distributed on the outer surface of the locking ring.

6. The transmission of claim 5, wherein one end of each of the wedge blocks is disposed on the locking ring, and another end thereof which is raised up from the outer surface of the locking ring is an outer end; outer end of the wedge blocks is elastically positioned on the outer surface of the locking ring via springs.

7. The transmission of claim 6, wherein the end of each of the wedge blocks is inserted in or hinged on the locking ring.

8. The transmission of claim 7, wherein the band-type brake ring is a circular clamp ring; the unfixed end of the band-type brake ring is driven by the gear shifting actuator to decrease a radius of the band-type brake ring; or when the gear shifting actuator is removed, the unfixed end's relaxation increases the radius of the band-type brake ring; when the band-type brake ring is in a relaxed state, the wedge blocks on the locking ring closely contact to the inner surface of the annular lug boss disposed on the planet carrier; the gear shifting actuator is a hydraulic cylinder, motor, or solenoid valve.

9. The transmission of claim 1, wherein
the locking ring comprises a plurality of rigid friction blocks; the rigid friction blocks are rigid metal blocks comprising positioning parts and friction parts;
the outer surface of the locking ring is provided with a plurality of first positioning slots configured to receive the rigid friction blocks; the positioning parts of the rigid friction blocks are positioned in the first positioning slots; compressed coil springs are disposed between the rigid friction blocks and the first positioning slots to tightly compress the friction parts of the rigid friction blocks to the inner surface of the annular lug boss.

10. The transmission of claim 9, wherein cross sections of the rigid friction blocks are T-shaped, and the rigid friction blocks are vertical to a tangent of the locking ring; narrow parts of the T-shaped rigid friction blocks are the positioning parts, and are positioned in the first positioning slots; while the wide parts of the T-shaped rigid friction blocks are the friction parts.

11. The transmission of claim 10, wherein bottoms of the positioning parts are provided with a plurality of second positioning slots configured to receive and position the coil springs.

12. The transmission of claim 11, wherein the band-type brake ring is a circular clamp ring; the unfixed end of the band-type brake ring is driven by the gear shifting actuator to reduce the radius of the band-type brake ring; or when the gear shifting actuator is removed, the unfixed end's relaxation increases the radius of the band-type brake ring; when the band-type brake ring is in a relaxed state, elastic sheets or wedge blocks on the locking ring closely contact with the inner surface of the annular lug boss disposed on the planet carrier; the gear shifting actuator is a hydraulic cylinder, motor, or solenoid valve.

13. The transmission of claim 9, wherein the rigid friction blocks are inclined at a certain angle to the radial directions of the locking ring; the first positioning slots configured to receive the rigid friction blocks are also inclined at the angel, and the positioning parts of the rigid friction blocks are positioned in the first positioning slots; the compressed coil springs are disposed between the bottom of the friction parts of the rigid friction parts and the first positioning slots.

14. The transmission of claim 13, wherein the band-type brake ring is a circular clamp ring; the unfixed end of the band-type brake ring is driven by the gear shifting actuator to decrease the radius of the band-type brake ring; or when the gear shifting actuator is removed, the unfixed end's relaxation increases the radius of the band-type brake ring; when the band-type brake ring is in a relaxed state, elastic sheets or wedge blocks on the locking ring closely contact with the inner surface of the annular lug boss disposed on the planet carrier; the gear shifting actuator is a hydraulic cylinder, motor, or solenoid valve.

15. The transmission of claim 1, wherein
the locking ring is a separate structure, and comprises a plurality of unit locking sheets which are annularly disposed;
fixing parts on lower ends of the unit locking sheets are clung to an outer ring of a power transmitting member to form an inner loop surface of the locking ring; the fixing end of the unit locking sheets are elastically bended towards the same direction to form friction parts of the unit locking sheets which are higher than the fixing parts; the unit locking sheets are elastic metal sheets with an arabic numeral 2 cross-section, or a letter C or V one.

16. The transmission of claim 15, wherein a tail end of the locking sheets comprises supporting parts which are located at the opposite end against the friction parts; the supporting parts are formed by bending upwards the tail end of the unit locking sheets; the supporting parts which are bended upward are lower than the friction parts of adjacent locking sheets.

17. The transmission of claim 15, wherein the unit locking sheets are composite elastic metal sheets with S-shaped or W-shaped cross-sections; the friction parts on the upper ends of the locking sheets are connected to the fixing parts on the lower ends of the locking sheets via elastic connection parts which are continuously bended; the unit locking sheets are fixed on the outer ring of the power transmitting member via U-shaped positioning slots; the fixing parts of the locking sheets are soldered to the U-shaped positioning slots, and the U-shaped positioning slots are soldered to the outer ring of the power transmitting member through resistance welding or laser welding.

18. The transmission of claim 1, wherein the locking ring is an integral structure, comprising an annular base; a surface of an outer ring of the annular base is stamped towards one direction to yield a plurality of bended friction parts on an upper end of locking sheets; the annular base beneath the friction parts comprises punched holes; an outer ring of a power transmitting member which is sheathed in the locking ring is provided with corresponding lug bosses; and the lug bosses pass through the punched holes to form supporting parts on a tail end of the locking sheets.

* * * * *